Patented June 15, 1937

2,083,863

UNITED STATES PATENT OFFICE 2,083,863

PROCESS OF TREATING CONCRETE AND THE LIKE

Johan Philip Pfeiffer, Amsterdam, Netherlands, assignor to Shell Development Company, San Francisco, Calif., a corporation of Delaware No Drawing. Application February 16, 1937, Serial No. 126,006. In the Netherlands March 10, 1936

3 Claims. (Cl. 34—24)

This invention relates in particular to a treatment of concrete, natural stone, brickwork and other silicic material prior to coating the same with asphalt, tar or other bitumen.

As is well known before impregnating silicic objects with protective coatings it is necessary to first remove as much as possible of the air and moisture in the object in order to effect a firm bond between the coating and the object being coated. If the moisture and air are not removed the coating may at a later date peel off exposing the silicic material which may be then attached and the structure weakened. Such protective coatings are particularly employed where concrete is used as a lining for sewer systems and used in the form of piles for supporting piers and other similar structures.

The existing processes for drying and making air free silicic objects for example, by means of hot gases, applying a vacuum and the like require a considerable amount of heat and time. With these processes during the heating up period the outside of the object being treated becomes dry even before the temperature reaches 100° C. The great disadvantage of this is that as dry stone has a considerably lower heat conductivity than wet stone, the removal of the remaining water during the evaporation period is greatly hampered resulting in a long treating period being required.

It is therefore an object of this invention to devise a process by which the time required to remove moisture and air from silicic material may be considerably reduced. A second object of my invention is to enable the pretreating of silicic material to be accomplished with a less amount of heat.

A further object of my invention is to remove more completely the water and air in silicic material so that a better impregnation with bitumen may be effected. The further objects and advantages of my invention will be apparent to those skilled in the art from the following description.

According to my invention the time and heat requirements are reduced by providing that during the raising of the temperature of the silicic material to the desired drying temperature evaporation of the water from the object being treated is wholly or substantially precluded.

This result may be obtained in various ways. Water is preferably used as a heating agent. The object to be treated is immersed in water and heated to a desired evaporation temperature above the boiling point of water by means of the operation being conducted at superatmospheric pressure. After the water has served as heating agent, the water is removed from around the object and the object dries upon a reduction of pressure. The temperature of the outside of the object first becomes reduced owing to evaporation of water therefrom and this allows the evaporation of water from the interior of the object.

Although heat is required in order to heat the object itself and to heat the water in which the object is immersed, the process is nevertheless more economical than existing processes in view of the short time in which it can be carried out.

The object thus dried may then be impregnated with asphaltic material, tar or other bitumen. In order to operate as economically as possible it is preferable to choose drying temperatures which will permit the immediate impregnation of the object upon the completion of the drying period.

As an example of operation according to my invention the following is given: A concrete pile which it was desired to impregnate with bitumen was first placed in a boiler. The boiler was filled with water and heated by means of hot flue gases to a temperature of 130° C., and maintained at a pressure of 2.76 atmospheres. After reaching the above temperature the water was removed from the boiler while the pressure was still maintained. The pressure and the temperature were gradually reduced on the boiler. Thereafter the pressure in the boiler was further reduced by means of a vacuum pump until a subatmospheric pressure of 15 centimeters of mercury was produced in the boiler. Molten bitumen having a temperature of about 130° C., was then run into the boiler, thus impregnating the concrete pile. A slight superatmospheric pressure was then produced in the boiler and the excess bitumen drained off. The pile was thereafter removed and after sufficient cooling was ready for service. Instead of using a temperature of 130° C., I may heat the object to higher temperatures, for example, 150° C., or to lower temperatures for example, 120° C. Instead of maintaining a pressure of 2.76 atmospheres other superatmospheric pressures may be used.

While in the above example, I have described the use of my process using only one treating vessel, it will be readily understood that two or more boilers may be used wherein the first would be used to heat the objects and a second to apply the bitumen. Instead of using asphalt or tar to impregnate the objects, other materials such as asphalt emulsion, paraffin wax, resins etc., may be applied.

My process for removing moisture and air from silicic material is applicable in almost all cases where it is desired to subsequently impregnate the object with a protective coating.

I claim as my invention:

1. Process for the drying of silicic objects comprising immersing said object in water in a closed vessel, heating said vessel until a temperature in excess of 100° C., and a superatmospheric pressure is reached, removing the water from around said object while maintaining the pressure on said object, thereafter gradually reducing pressure whereby water is evaporated from said object.

2. Process for the drying of silicic objects comprising immersing said object in water in a closed vessel, heating said vessel until a temperature of approximately 130° C., and a pressure of 2.76 atmospheres is reached, removing the water from around said object while maintaining said pressure and temperature conditions, thereafter reducing the pressure to below atmospheric pressure whereby drying of object is effected.

3. Process for the drying of silicic objects comprising immersing said object in water in a closed vessel, heating said vessel until a temperature in excess of 100° C., and a superatmospheric pressure is reached, removing the water from around said object while maintaining the pressure on said object, thereafter gradually reducing the pressure and temperature whereby water is evaporated from said object.

JOHAN PHILIP PFEIFFER.